3,326,774
PROCESS FOR PRODUCTION OF CITRIC ACID
BY FERMENTATION
William Gold, Spring Valley, and Robert J. Kieber, Locust, N.J., assignors, by mesne assignments, to Stepan Fermentation Chemicals, Inc., Keyport, N.J., a corporation of Delaware
No Drawing. Continuation of application Ser. No. 470,198, July 7, 1965, which is a continuation of application Ser. No. 208,902, July 10, 1962. This application June 6, 1966, Ser. No. 555,940
10 Claims. (Cl. 195—36)

This application is a continuation of application Ser. No. 470,198, filed July 7, 1965, now abandoned, which is a continuation of application Ser. No. 208,902, filed July 10, 1962, now abandoned.

This invention relates to production of citric acid by fermentation and has as its object provision of an improved method for the fermentation.

According to the invention, preparatory to the fermentation, there is added to a fermentation medium containing a suitable fermentable carbon source and in cool, sterile condition, a sterile ferrocyanide or ferricyanide salt, and a citric acid producing and accumulating organism for production of citric acid from the carbon source, and the resulting cool medium containing the salt and organism is provided at a pH of about 6–9.

Further, according to the invention, the organism employed as the ferment is allowed to germinate in a germination medium containing nutrient for promoting germination of the spores and containing as an adjunct a minor proportion of starch. The germinated spores are then included in a fermentation medium containing a carbon source fermentable to citric acid and the medium is then maintained at conditions for the production by fermentation of citric acid.

The fermentation is carried out by maintaining the medium for a time and at conditions suitable for the production of citric acid.

The fermentation can be carried out in a deep tank, and a principal advantage of the method is that it facilitates production of citric acid by the deep tank or submerged culture procedure.

Another principal advantage of the method of the invention is that it is suited to produce citric acid from readily available carbon sources in the unrefined condition. Preferably the carbon source is an impure sugar cane material, such as cane blackstrap molasses or cane high test molasses. Other impure sources can be used. The fermentable carbon source need not, however, be an impure material, and it can be any carbon source known in the art as a suitable substrate for production of citric acid. Beet molasses and starch hydrolysates are suitable.

The citric acid producing and accumulating organism can be any of the known organisms for this purpose. Thus, it can be of the groups, Aspergillus, Citromyces, Penicillium and Monilia. Black Aspergilli, particularly Aspergillus niger, are well suited. Suitable species are Aspergillus japonicus, Aspergillus clavatus, Paecilomyces divaricatum, Mucor piriformis, Penicillium luteum, and Penicillium citrinum. The organism, upon introduction into the fermentation medium is preferably in the form of spores since the greatest benefits from the method of the invention are realized when the organism is in this form. The organism can, however, be in other forms. Thus it can be in the form of mycelium, pre-germinated spores, or comminuted mat. Specific organisms suitable for the purposes of the invention are ATCC 10577 and ATCC 11414. ATCC 10577 is strain XX11 for citric acid production of J. A. Benkiser Plant, Ladenberg, Germany. ATCC 11414 is Wisconsin strain 72–4, used by Martin in Patent 2,739,923, issued Mar. 27, 1956, and described in J. Bacteriology, vol. 52, page 555.

Usually, there will be an optimum amount of inoculum, especially where the fermentation is carried out in a deep tank, as when the amount of inoculum is excessive, aeration is interfered with to the extent that yield is reduced. This is commonly the case where a germinated inoculum is employed, and in each case, advantageously, the inoculum is used in an amount predetermined to provide relatively high yields. The optimum amount can be determined by experiment.

THE IRON CYANIDE SALT

The iron cyanide salt can, in general, be any salt soluble in the fermentation medium, e.g. water-soluble iron cyanide salts, preferably inorganic salts such as sodium or potassium salts. The ferrocyanide or ferricyanide salts can be used.

The pH of the medium can be adjusted by addition to the medium of an aqueous solution of a pH adjusting agent. In the case of impure cane derived sources the natural pH of aqueous solutions thereof will usually be on the acid side and below about 5.5 Thus, in the case of cane blackstrap molasses, the natural pH of the aqueous solutions is commonly about 4.8–5.2. For adjusting the pH of such solutions, calcium hydroxide, calcium oxide, sodium hydroxide, and the like can be used to raise the pH into the range of about 6–9, which is the pH condition of the invention for the medium. The preferred pH is about 7–8 and, for cane blackstrap molasses, optimum pH is usually about 8. The optimum value is related to the degree of impurity. In general, the more impure the medium, the higher the optimum pH value.

The procedure for the fermentation involves forming an aqueous fermentation medium by dissolving the carbon source in water to provide a solution wherein the concentration of the carbon source is limited so that the fermentation rate is not inordinately low. Where the carbon source is cane blackstrap molasses, the amount of molasses in the aqueous solution can be about 20–40% w./v. molasses depending on the particular molasses employed. This corresponds to a total surgar (as sucrose) content of about 10–26% w./v. Amounts of carbon source can be outside the mentioned range and can be either more or less, but in general this will result in reduced efficiency for the process. Commonly, addition of nutrients other than the carbon source is not required. Where, however, the carbohydrate source is deficient in respect to nutrient materials, the additions, e.g. of nitrogenous material or mineral material such as phosphorous compounds, are desirable.

The fermentation medium is then sterilized with heat. The sterilization is carried out in the usual manner, i.e. by heating the medium at a temperature of usually at least about 100° C. to destroy organisms present therein which would interfere with the fermentation.

The hot sterile medium is then cooled from sterilization temperature and the iron cyanide salt, in sterile and preferably cooled condition, and the organisms for the fermentation, and the pH adjusting reagent are then added to the medium. The fermentation can then be carried out by maintaining the medium at fermentation conditions for a suitable time.

It is important to realization of the improvement of the invention that the sterile fermentation medium be cooled before the iron cyanide salt is added thereto. The temperaturew to which it is cooled can be in the range of about ambient temperature to about 75° C., and preferably about ambient temperature to about 50° C., for example 40° C., and optimally about ambient temperature to about 30° C. While the temperature, at which the iron cyanide salt is added can be in excess of 50° C., this is undesirable, since the procedure of the invention is then of substantially less effectiveness. The medium can be cooled to below 30° C. before addition of the salt but this would not provide any advantage and would usually be inconvenient since the usual temperature for the fermentation is about 30° C.

The iron cyanide salt added to the fermentation medium can be in the form of a sterile, aqueous solution thereof. This can be provided by dissolving the iron cyanide salt, commercial grade, in water and then sterilizing with heat. When sterilized in this manner, the salt solution is preferably concentrated, e.g. a 10% w./v. solution of the salt. The amount of the salt added to the fermentation medium can be about 0.05–0.4% by weight per 20% w./v. of molasses present in the fermentation medium. Amounts, either more or less, outside this range can be used, but the mentioned range is preferred. In general, within the preferred range there will be an optimum amount of the salt. The optimal amount will usually depend on the particular carbon source used, for example the particular cane blackstrap molasses, and it can be determined by testing to provide the best time-yield relationship. The variation in yield, even over a narrow range such as 0.05–0.4% by weight of the salt, is commonly as much as 75% of the optimum yield. The amount of the salt solution added to the fermentation medium will in general be small in comparison to the fermentation medium, e.g. 1%, and the salt solution added will not substantially alter the molasses concentration in the medium. Advantageously, the salt solution is cooled before addition to the medium. The temperatures mentioned herein as suitable, preferable, etc. for the medium apply similarly to the salt solution.

It is important in order to realize the full benefits of the pH adjustment that the pH of the medium at the beginning of the fermentation be in the range of about 6–9, preferably about 7–8 and optimally about 8. Preferably, the adjustment in pH is made after sterilization and when the medium is in the cooled condition. Thus, in the case of impure cane derived carbon sources, such as for example, cane blackstrap molasses, reducing sugars are degraded if the sterilization is carried out at an elevated pH. The degradation can be avoided by sterilizing before adjusting the pH.

When the pH is adjusted after sterilization, it should be done aseptically as is the addition of iron cyanide salt. The suitable and preferred temperatures for adjustment of pH are in general the same as those for the addition of the iron cyanide salt.

A distinctive feature of the procedure of the invention is the provision of the medium containing the iron cyanide salt in sterile condition without sterilizing the medium with heat when the salt is present therein. Further, as described above, sterilizing with heat when the medium is at the initial pH for the fermentation should be avoided. Normally, these requirements will necessitate the procedure described above of separately sterilizing the medium containing the carbon source, without the iron cyanide salt, and at the natural pH, and thereafter adding to the cooled medium the iron cyanide salt and adjusting the pH of the cooled medium. If, however, a means of sterilizing other than by application of heat is resorted to, it will be apparent that the improvement of the invention can be realized by providing a cool fermentation medium containing the carbon source, including in the cool medium the iron cyanide salt, and providing the medium containing the salt in sterile condition while in said cooled condition, and further providing the cool sterile fermentation medium at the desired initial pH for the fermentation.

The use of a ferricyanide or ferrocyanide salt and of a pH according to the invention provides improvement in respect of yield of the citric acid.

USE OF STARCH

In a preferred manner for practicing the invention, the starch and spores are added to the fermentation medium and the spore germination occurs in the medium as an incident of the fermentation. If desired, however, the germination can be carried out separate from the fermentation, in which case the germinated spores are used as the inoculum.

Advantages of the method of the use of starch according to the invention are reduction in the amount of inoculum required to obtain a given yield in a given time, or alternatively, reduction in fermentation time for a given yield and a given amount of inoculum. Thus, practice of the invention permits selection of a relationship of fermentation time, inoculum size, and yield which is best suited to the prevailing conditions.

As indicated above, upon introduction into the fermentation medium, the organism is preferably in the form of spores but can be germinated spores, provided the germination is carried out in the presence of starch according to the invention. The germinated spores can be in the form of hycelium or comminuted mat.

The starch can be in the form of the cornstarch of commerce or potato starch, and the like. It is used in minor proportion such as a small but effective amount. It can be a fraction of 1% w./v. In general, the preferred amount is 0.025–0.5% w./v. of the fermentation (or germination) medium. For fermentation, e.g. of impure cane material such as cane blackstrap molasses, 0.1% w./v. is well suited for the purposes of the invention. The starch is not utilized as a principal nutrient, and according to the invention starch is employed as an adjunct and in addition to principal nutrient material. While amounts in excess of 1% w./v. can be used, in general, there will be no advantage to using larger amounts. An amount which would cause thickening of the medium which will usually be about 1–2% w./v., would normally be undesirable as this would interfere with the aeration, and it is not intended to use thickening amounts.

The starch can be added directly to the fermentation (or germination) medium and can be present during fermentation. Alternatively it can be included in the spore inoculum. If desired, starch can be added directly to the fermentation (or germination) medium and also included in the spore inoculum.

To include starch in the inoculum, the spores can be admixed with a starch gel and the resulting admixtures can then be shaken to disperse the spores in the gel and provide the spores in the form of a fluid starch slurry. This slurry can then be used as the inoculum.

While the phenomenon responsible for the improvement incidental to the use of starch according to the invention is not surely known, it has been noted that the improvement occurs only when the starch is present during germination. Accordingly, where a spore inoculum is used, the starch is effective during the initial stages of the fermenation and where germinated spores are used it is effective during the germination of the spores.

As indicated above, the use of starch according to the invention reduces the required spore count for optimum yield or yield-time relationship. By "spore count," reference is made to the amount of inoculum, whether in the form of spores or germinated spores. In the case of germinated spores, the spore count would be the number of spores from which the germinated spores were derived. The spore count best suited for a fermentation depends on the particular fermentation conditions, and, accordingly, the optimum spore count can be determined by test fermentations of specimens of the fermentation medium containing the starch and conducted at various spore counts, and then selecting the spore count for the optimum fermentation results. The optimum spore count for submerged fermentation is commonly 500–15,000 and preferably 5,000–15,000 spores per ml. by microscopic count.

Where germinated spores are used as the inoculum, the germination can be carried out as is well known in the art, and employing starch according to the invention, and the procedure can be appropriately modified to allow for this variation.

EXAMPLES

The fermentation, by the submerged culture procedure, can be carried out in a manner known in the art. Thus, the fermentation can be carried out in a deep tank wherein the medium is agitated and aerated with air or other oxygen containing gas. The temperature for the fermentation can be in the range of about 25–35° C., preferably 29–32° C. and optimally 31° C. Atmospheric, or if desired, slightly elevated pressure in order to preclude harmful leakage, can be employed. The fermentation period can be two days or longer.

Alternatively, the fermentation can be carried out by the shallow pan procedure.

The invention is further described in the following examples:

Example 1

A fermentation medium is prepared in a 6" x 18" Pyrex jar provided with a stirrer and sparger for aeration. A 4 liter aqueous solution of cane blackstrap molasses containing 20% w./v. molasses which provides a total sugar content for the solution of about 12% w./v., is introduced into the jar. This mash is sterilized, cooled to about 30° C. and there is added there to 8 grams of potassium ferricyanide contained in a cool, sterilized 10% aqueous solution thereof, and the solution is then adjusted from a natural pH for the solution of 5 to pH 6.1 with calcium hydroxide.

For inoculation of the fermentation medium 5 ml. of an aqueous suspension of germinated spores of an Aspergillus sp. is added aseptically to the fermentation medium. Germination is effected in a synthetic medium containing 0.1% w./v. of cornstarch added to the medium as a powder, and by shaking for 24 hours at 31° C. The inoculum-containing medium is agitated and aerated at 31° C. for six days.

Citric acid is obtained in good yield, e.g. in excess of 5%. If starch is not used, about the same yield will be obtained by using substantially more of the germinated spores.

Example 2

A fermenation medium is prepared by charging a 2,000 gallon capacity deep tank fermentor with 1,700 gallons of water diluted cane blackstrap molasses. The diluted molasses is 25% w./v. 79 Brix molasses, and has a sugar (as sucrose) content of 13.1% w./v. Cornstarch in amount of 0.1% w./v. is added to the fermentor and the diluted molasses containing starch is sterilized at 100° C. for 15 minutes, and then cooled to 30° C. An aqueous solution of 24 pounds of sodium ferrocyanide and 32 pounds of calcium hydroxide in 20 gallons of water is sterilized by heating to 100° C., cooled to about room temperature, and then added to the sterilized and cooled contents of the fermentor. Following this addition, the pH of the medium is 7.8.

For inoculation of the fermentation medium, a 100 ml. aqueous suspension of spores of an Aspergillus sp. is introduced into the tank.

Citric acid, calculating the percent acid as citric acid is in excess of 5%.

Instead of adding the starch directly to the fermentation medium, it can be first combined with the spores by adding the spores to the starch in the form of a sterilized gel. The starch-spore mixture can then be shaken to obtain a fluid slurry and the slurry can be added to the fermentation medium.

The citric acid production reported in the specification as "percent acid as citric" is percent w./v. of acid in the fermented medium calculated as anhydrous citric acid. The acidity of the fermented medium was determined by titration. Of the total acid present 95% or more is citric.

The teaching of Martin in U.S. Patent 2,739,923, issued Mar. 27, 1956, is acknowledged. Martin teaches inclusion of a ferrocyanide salt in a fermentation medium which is sterilized but still hot. This is a procedure which, according to the present invention, should be avoided.

What is claimed is:

1. The method of producing citric acid by fermentation of a fermentable carbon source, which comprises providing a cool fermentation medium including the fermentable carbon source, including in said cool medium a salt selected from the group consisting of ferrocyanide and ferricyanide salts, providing the medium containing said salt in sterile condition while in said cooled condition, including in the cool, sterile fermentation medium a citric acid producing and accumulating organism for production of citric acid from the carbon source, providing the cool, sterile fermentation medium containing said organism at a pH of about 6–9, the said organism being maintained as spores in a germination medium containing nutrient for promoting germination of the spores and containing starch as an adjunct in a minor proportion relative to said nutrient for a time and at a temperature for germination of the spores, maintaining the thus constituted fermentation medium for a time and at conditions for production of citric acid by fermentation of the carbon source.

2. The method of claim 1, wherein the optimum spore count for the fermentation is determined by test fermentations of specimens of the fermentation medium and conducted at various spore counts and selecting the spore count for the optimum fermentation results as the optimum spore count and employing said spore count in said fermentation of the fermentable carbon source.

3. The method of claim 2, wherein the spore count for the fermentation is about 500–15,000 spores per ml. of fermentation medium.

4. The method of claim 1, wherein the spores are germinated in the fermentation medium.

5. The method of claim 4, wherein before inclusion of the spores in the fermentation medium the spores are admixed with a starch gel and dispersed within the starch of the gel, and the resulting dispersion is introduced into the fermentation medium to include the spores and starch therein.

6. The method of claim 1, wherein the spores are germinated in a medium separate from the fermentation medium, and the germinated spores are thereafter added to the fermentation medium.

7. The method of claim 1, wherein the cool fermentation medium containing said salt and said organism is provided at a pH of about 7–8.

8. The method of claim 1, wherein said carbon source is an impure cane derived material.

9. The method of claim 1, wherein the amount of starch in the germination medium is less than about 1% w./v.

10. The method of preparing a spore inoculum for a citric acid fermentation which comprises admixing spores of a citric acid producing and accumulating organism with a starch gel, and dispersing the spores in the starch.

No references cited.

A. LOUIS MONACELL, *Primary Examiner.*

L. M. SHAPIRO, *Assistant Examiner.*